United States Patent [19]

Baba

[11] Patent Number: 4,827,362
[45] Date of Patent: May 2, 1989

[54] MAGNETIC DISK DEVICE HAVING COMPENSATION FOR DIMENSIONAL CHANGE

[75] Inventor: Hiroshi Baba, Kamakura, Japan

[73] Assignee: Mitsubishi Denki K.K., Tokyo, Japan

[21] Appl. No.: 55,193

[22] Filed: May 28, 1987

[30] Foreign Application Priority Data

May 28, 1986 [JP] Japan .................... 61-122808

[51] Int. Cl.⁴ ............................................ G11B 5/596
[52] U.S. Cl. .......................... 360/77.04; 360/77.06
[58] Field of Search ............................. 360/77, 78

[56] References Cited

U.S. PATENT DOCUMENTS

Re. 32,075  1/1986  Harrison et al. ............... 360/77
4,136,365  1/1979  Chick et al. ..................... 360/78

FOREIGN PATENT DOCUMENTS 54-130004   9/1979  Japan ........................... 360/77
54-158206  12/1979  Japan ........................... 360/77
60-113370   6/1985  Japan ........................... 360/77

OTHER PUBLICATIONS

IBM Tech. Disc. Bulletin, Positioning Mechanism and Error Sensing Device, G. N. Gaebelein, vol. 1, No. 1, Jun. 1958, p. 10.
IBM Tech. Disc. Bulletin, Generation of Position Correction Signal for All Disk Pack Surfaces, vol. 12, No. 11, Apr. 1970, G. R. Santana, p. 1891.
IBM Tech. Disc. Bulletin, Accessing Technique for Magnetic Disks, J. F. Elliott, vol. 17, No. 5, Oct. 1974, pp. 1464–1465.
IBM Tech. Disc. Bulletin, Correction of Data Track Misregistration in Servo Controlled Disk Files, A. Paton, vol. 17, No. 6, Nov. 1974, pp. 1781–1783.
C. A. Walton, "Track Following and Seeking System," *IBM Technical Disclosure Bulletin*, vol. 13, No. 11, Apr. 1971.

Primary Examiner—Aristotelis M. Psitos
Assistant Examiner—David L. Robertson
Attorney, Agent, or Firm—Takeuchi Patent Office

[57] ABSTRACT

An off-set signal provided from an off-set detector is stored in a memory. When a head is positioned on a data track, an off-set signal stored in the memory is read out to correct the head position and position the head to the center of the data track, thus effecting accurate reading and writing of data. An off-set generator feeds the servo system with a dummy off-set signal for producing an off-set correction signal, whereby the servo system corrects the off-track of the magnetic head.

5 Claims, 3 Drawing Sheets

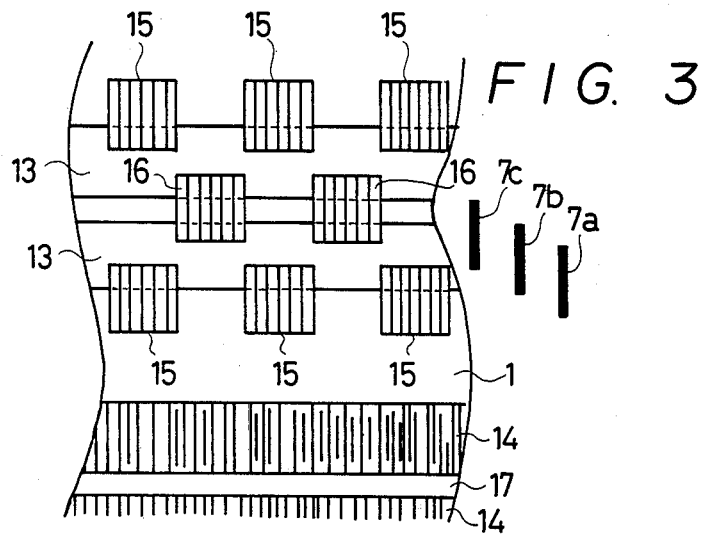
FIG. 3
FIG. 4
(A) 
(B) 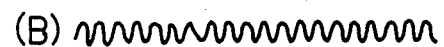
(C) 
FIG. 5
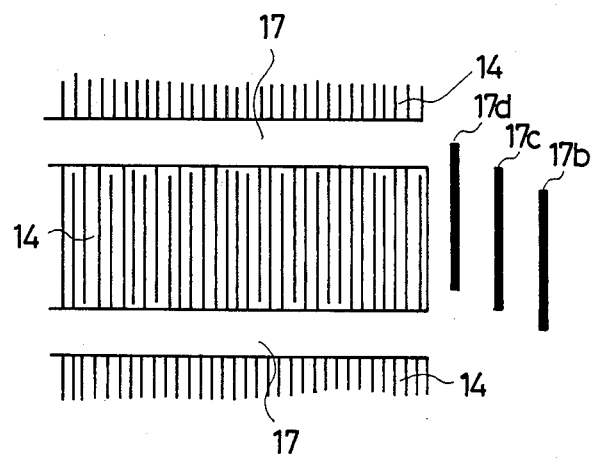

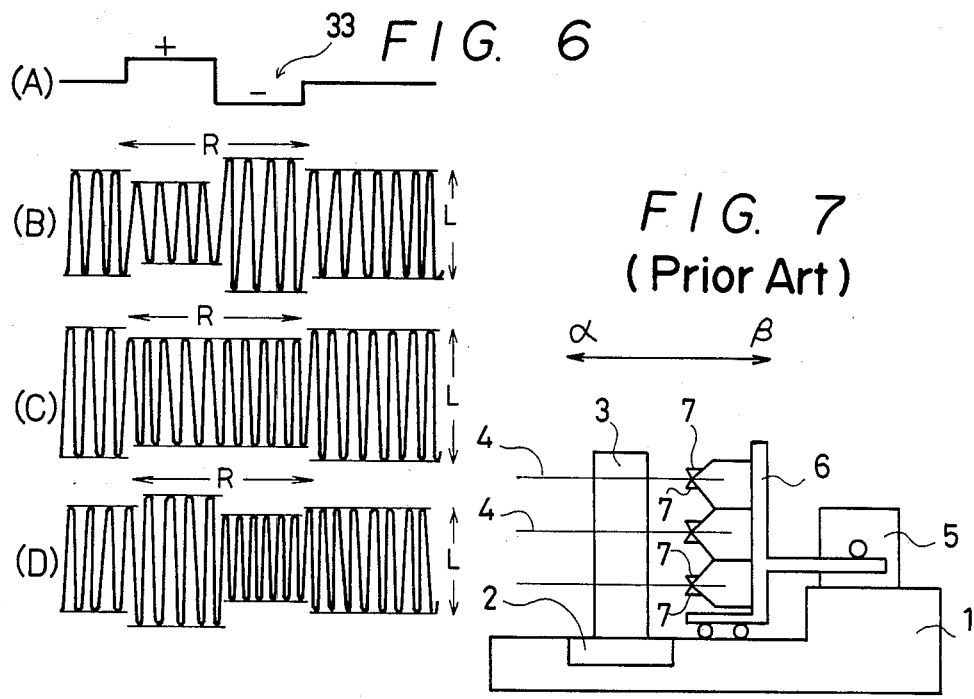
FIG. 6
FIG. 7 (Prior Art)
FIG. 8 (Prior Art)
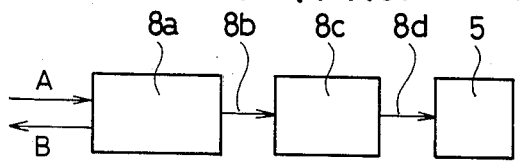
FIG. 9 (Prior Art)
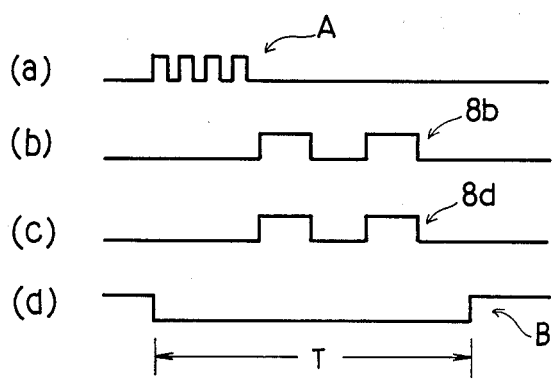

MAGNETIC DISK DEVICE HAVING COMPENSATION FOR DIMENSIONAL CHANGE

FIELD OF THE INVENTION

This invention relates to a magnetic disk device and, more particularly, to the positioning of a magnetic head in such device.

DESCRIPTION OF THE PRIOR ART

FIG. 7 shows a prior art magnetic disk device. Reference numeral 1 designates a base. On the base 1, a spindle motor 2 is supported with its drive shaft 3 extending upright. A plurality of magnetic disks 4 are mounted on the drive shaft 3 for rotation. Each magnetic disk 4 has a plurality of data tracks with information recorded therein. A stepping motor 5 is provided on the base and is coupled to the drive shaft. On the base 1, there is also provided a carriage 6 for reciprocation in the radial directions (shown by arrow α←→β) of the magnetic disk 4. The carriage 6 is driven for reciprocation by the stepping motor 5. It is coupled to the drive shaft of the stepping motor 5 via coupling means such as a steel band, a gear, etc. The carriage 6 supports magnetic heads 7.

By controlling the drive voltage supplied to the stepping motor 5, the extent of displacement of the carriage 6 is controlled to bring the magnetic heads to intended data tracks of the disks 4. The drive voltage is provided from a driver 8c shown in FIG. 8. The driver 8c is controlled by a position controller 8a. Now, the construction of the position controller 8a will be described.

Shown at A is a head displacement command provided from a controller (not shown). The waveform of the head displacement command is shown in FIG. 9(a). The position controller 8a receives the head displacement command A and determines the direction of movement of the magnetic heads 7 (either direction α or β) and also the distance of movement, thereby producing a corresponding drive signal 8b. The waveform of the drive signal 8b is shown in FIG. 9(b).

The driver 8c receives the drive signal 8b and provides a drive voltage 8d corresponding to the drive signal 8b to the stepping motor 5. FIG. 9(c) shows the waveform of the drive voltage 8d. The stepping motor 5, which receives the drive voltage 8d, is rotated by a predetermined angle in a predetermined direction. Shown at B is a head displacement completion signal which is provided to the controller. FIG. 9(d) shows the waveform of the head displacement completion signal B. The head displacement completion signal B goes to a lower level upon input of the head displacement command, and rises to a high level after the lapse of time T which is required for the magnetic heads 7 to be positioned on desired data tracks upon supply of the drive signal 8b from the position controller 8a.

In the prior art, however, there is the following problem.

The position of the magnetic head 7 in the radial direction of the disk is controlled by open loop control and is determined by the rotational angle of the stepping motor 5 which is controlled by the head displacement command A. Therefore, with changes in the ambient temperature or the like a relative positional deviation between the centers of the head 7 and data track is generated due to differences in the thermal expansion coefficient among the disk, base, actuator, etc.

SUMMARY OF THE INVENTION

The primary object of the invention is to provide a magnetic disk device, which can correct a relative positional deviation between the head and the data track.

The above and other objects, features and advantages of the invention will become more apparent from the following detailed description with reference to the accompanying drawings.

BRIEF DESCRIPTION OF THE DRAWINGS

FIGS. 1 to 6 concern an embodiment of the invention, in which:

FIG. 1 is a block diagram showing a magnetic disk device;

FIG. 3 is an enlarged view showing a pair of servo tracks;

FIG. 4 is a waveform diagram showing three read-out servo signals;

FIG. 5 is an enlarged view showing a data track with three different positions of a magnetic head; and FIG. 6 is a waveform diagram showing read-out information; and FIGS. 7 to 9 concern the prior art, in which:

FIGS. 7 and 8 show the structure of a magnetic disk device and a position controller thereof, respectively; and FIG. 9 is a waveform diagram.

DESCRIPTION OF THE PREFERRED EMBODIMENT

Figure 1:
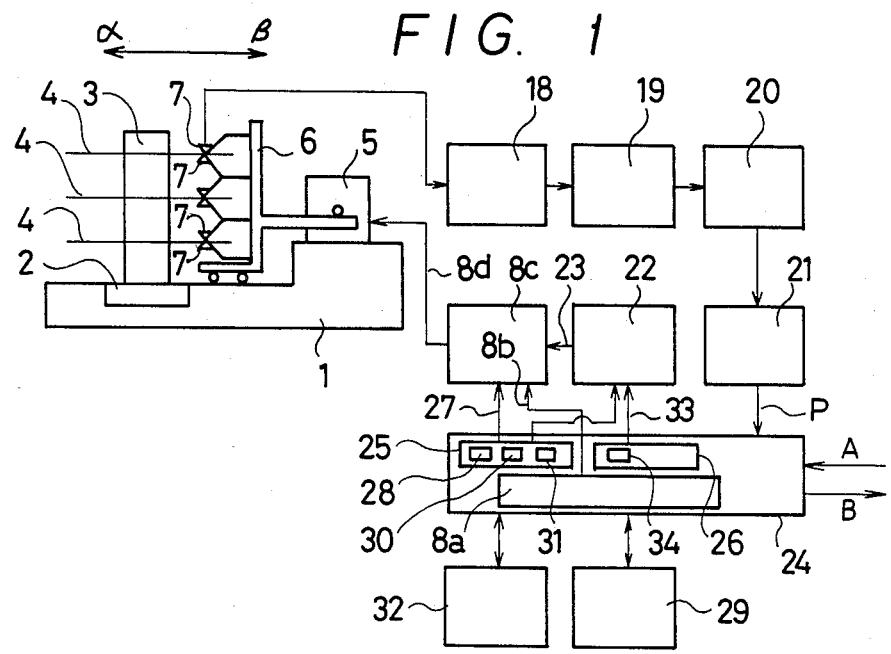

Now, an embodiment of the invention will be described with reference to FIGS. 1 to 6. Elements like those of the prior art described before with reference to FIGS. 7 to 9 are designated by same reference numerals, and their description will be omitted.

Figure 2A:
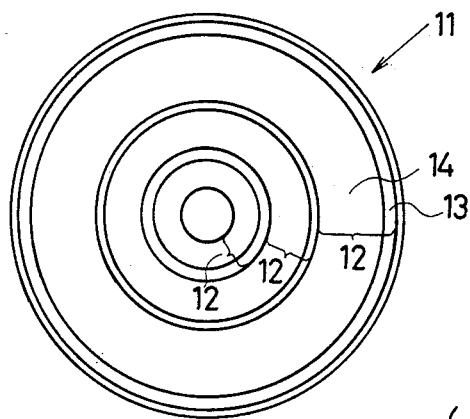
FIGS. 2(A) and 2(B) are views showing a magnetic disk and a portion thereof, respectively.
Figure 2B:
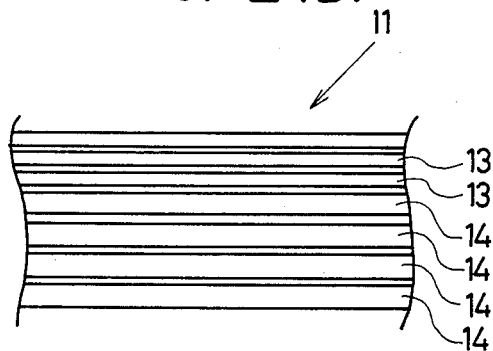

FIG. 2(A) is a plan view showing a magnetic disk according to the invention. The magnetic disk 11 has three track blocks 12. As shown in FIG. 2(B), each track block 12 has a plurality of servo tracks 13 and a plurality of data tracks 14 provided on the inner side of each servo track 13. As shown in FIG. 3, magnetism generators 15 and 16 which produce different magnetic forces are provided alternately on the opposite sides of each servo track 13. Further, as shown in FIG. 5, data is recorded on each data track 14, and adjacent data tracks 14 are spaced apart by a gap 17.

FIG. 1 is a view showing the entire magnetic disk device. Reference numeral 18 designates a amplifier for amplifying the output of the magnetic heads 7, numeral 19 a rectifier for rectifying the output of the amplifier 18, numeral 20 an A/D converter, and numeral 21 an off-set detector for receiving the output of the A/D converter 20. According to the output of a magnetic head 7, the off-set detector 21 provides an off-set signal P, which represents an off-track amount of the magnetic head 7 and the off-track direction in which the magnetic head 7 is off-track from the desired track.

The off-set corrector 22 provides an off-set correction signal 23 to the driver 8c. The driver 8c provides a drive voltage corresponding to the off-set correction singal 23 to the stepping motor 5 to move the magnetic heads 7 so as to remove the off-set.

Reference numeral 24 designates a position controller according to the invention. The position controller 24 has first and second auxiliary position controllers 25 and 26 in addition to the position controller 8a of the prior art.

The first auxiliary position controller 25 effects off-set correction at the start, i.e., when the power switch is closed. The first auxiliary position controller 25 has a driving controller 28 which positions the magnetic heads 7 to the servo tracks 13 by providing a drive voltage 27 having a predetermined value to the driver 8c immediately after the closure of the power switch, writing means 30 which writes in the memory 29 an off-set signal P representing the amount and direction of an off-set as detected by the off-set detector 21 immediately after the positioning and reading means 31, which reads out the off-set signal P having been written in the memory 29 and provides it to the off-set corrector 22. When the magnetic head 7 is off-set from the servo track 13, an off-set signal P representing the amount and direction of the off-set is written in the memory 29. Further, the reading means 31 is operated after the operation of the position controller 8a, i.e., after the position controller 8a has brought the magnetic head 7 to a desired data track according to the head displacement command A. As a result, the off-set of the magnetic head 7 with respect to the data track 14 is corrected. This is so because the amount of an off-set when the magnetic head 7 is positioned to a servo track 13 and the amount of an off-set when the head 7 is positioned to a data track 14 are equal. Changes of the magnetic disks 4 under thermal influence can be obtained by positioning the magnetic head on the servo track 13 and obtaining the off-set amount at this time. According to this off-set amount the off-set when the head 7 is positioned to the data track 14 is corrected.

Reference numeral 32 designates a timer, which clears data stored in the memory 29 after a predetermined period of time.

The second auxiliary position controller 26 operates after the start of data-reading operation subsequent to the positioning of the magnetic head 7 to a desired data track 14. The second auxiliary position controller 26 consists of an off-set generator 34, which causes an off-set of the magnetic head 7 from the data track by providing a dummy off-set signal 33 having a waveform such as shown in FIG. 6(A) to the off-set corrector 22.

Now, the operation will be described.

First, the power switch is closed at the start of operation. As a result, the driving controller 28 of the first auxiliary position controller 25 provides a drive voltage 27 to the driver 8c.

It is now assumed that the magnetic head 7 has been off-set with respect to the servo track 13 under an influence of temperature or the like. The off-set amount is detected by the off-set detector 21 via the amplifier 18, rectifier 19 and A/D converter 20. The off-set detector 21 thus provides an off-set signal P.

Now, the operation of the off-set detector 21 to detect an off-set will be described. First, it is assumed that the magnetic head 7 is positioned at the center of the servo track 13 and not off-set therefrom, as shown at 7b in FIG. 3. The output of the magnetic head 7 at this time is a signal having a constant amplitude as shown in FIG. 4(B).

It is now assumed that the magnetic head 7 is off-set to the inner side of the servo track 13 as shown at 7a in FIG. 3. In this case, the output of the magnetic head 7 is a signal having an increased amplitude for periods corresponding to the positions of the magnetism generators 15 as shown in FIG. 4(A). This is so because the magnetic head 7 reads out a large portion of the magnetism of the magnetism generators 15 but only a small portion of the magnetism of the magnetism generators 16.

If the magnetic head 7 is off-set to the outer side of the servo track 13 as shown at 7c in FIG. 3, the output of the magnetic head 7 is a signal having an increased amplitude for periods corresponding to the positions of the magnetism generators 16 as shown in FIG. 4(C). This is so because the magnetic head 7 reads a small portion of the magnetism of the magnetism generators 15 but a large portion of the magnetism of the magnetism generators 16. The off-set detector 21 detects the amount and direction of the off-set according to a waveform of the readout output of a magnetic head 7 and provides an off-set signal P.

The off-set signal P is written in the memory 29 through the writing means 30 of the first auxiliary position controller 25. Subsequently, the position controller 8a provides a head displacement command A. The driver 8c is controlled according to the head displacement command A to bring the magnetic head 7 to a desired data track. Usually, however, the magnetic head 7 is off-set with respect to the data track under an influence of temperature or the like. The amount of off-set coincides with the detected off-track amount between the magnetic head 7 and servo track 13. Subsequently, the reading means 31 of the first auxiliary position controller 25 reads out the off-set signal P stored in the memory 29 and provides it to the off-set corrector 22.

The off-set corrector 22 provides an off-set correction signal 23 corresponding to the off-set amount to the driver 8c. The driver 8c controls the carriage 6 according to the off-set correction signal 23 to move the magnetic heads 7. In this way, the amount of off-set between the magnetic head 7 and data track 14 is corrected. The operation so far is referred to as a positioning mode.

After the magnetic head 7 has been positioned in this way, it executes the operation of reading out recorded information from the data track 14.

After the off-set between the magnetic head 7 and the data track 14 has been corrected, however, another off-set may occur. This is more likely to occur when the temperature of air in the room where the magnetic disk device is used is high. Thus, the second auxiliary position controller 26 is operated.

First, the off-set generator 34 provides a dummy off-set signal 33 to the off-set corrector 22.

FIG. 6(A) shows the waveform of the dummy off-set signal 33 for moving the magnetic heads 7 toward the periphery of the magnetic disks 4 when it is high and toward the center of the magnetic disks 4 when it is low.

FIGS. 6(B), 6(C) and 6(D) show the output waveforms of the off-set signal P provided by the off-set detector 21 immediately after supply of the dummy off-set signal 33. FIG. 6(C) shows the read-out waveform immediately after supply of the dummy off-set signal 33 when the magnetic head 7 is positioned at the center of the data track 14 as shown at 17c in FIG. 5. In the off-set portion R, the amplitude L of the read-out data is reduced to an extent corresponding to the off-set amount of the magnetic head 7.

FIG. 6(B) shows the read-out waveform immediately after supply of the dummy off-set signal 33 when the magnetic head 7 is slightly off-set to the inner side of the magnetic disks 4 from the data track 14. In a portion of the off-set portion R corresponding to the low portion of the dummy off-set signal 33, the amplitude L of the read-out data is increased. This occurs because of the fact that the magnetic head 7 reaches a data track 14 inside the desired data track and reads out part of the data recorded in this data track 14. FIG. 6(D) shows the read-out waveform immediately after supply of the dummy off-set signal 33 when the magnetic head 7 is slightly deviated to the outer side of the data track 14 as shown at 17d in FIG. 5. In a portion of the off-set portion R corresponding to the high portion of the dummy off-set signal 33, the amplitude L of the read-out data is increased. This is so because the magnetic head 7 reaches a data track 14 outside the desired data track and reads out part of the recorded data.

Thus, the off-set detector 21 detects the amount and direction of an off-set from the waveform of the read-out data provided from the magnetic head 7 and provides an off-set signal P. The off-set corrector 22 provides an off-set correction signal 23 corresponding to the off-set signal P to the driver 8c. The driver 8c provides a drive voltage output corresponding to the off-set correction signal 23 to the carriage 6. Thus, the off-set amount of the magnetic head 7 is corrected, and the magnetic head 7 is accurately positioned on the data track 14.

When the magnetic head 7 is moved to a new data track 14 after a predetermined period of time set in the timer 32, the positioning mode noted above is executed again to renew data stored in the memory 29. The predetermined period of time noted above can be freely set depending on the ambient temperature. When the ambient temperature is high, for instance, an off-set is liable to be generated, so that a short period of time is set.

In the above embodiment, the A/D converter 20, off-set detector 21, off-set corrector 22, memory 29, timer 32 and position controller 24 are provided separately. However, these components may all be incorporated in a microcomputer or the like.

Further, while the above embodiment has concerned with a magnetic disk device using a stepping motor, the same results may also be obtained when the invention is applied to a magnetic disk device of servo surface servo type, a magnetic disk device using an encoder or a voice coil motor or a magnetic disk device using a torque motor and an encoder.

As has been described in the foregoing, according to the invention the amount and direction of off-track when the magnetic head is positioned on a servo track are stored in a memory, and the off-set between the magnetic head and the data track is corrected according to the data stored in the memory. Thus, the magnetic head can be accurately positioned on the data track without any off-set.

What is claimed is:

1. A magnetic disk device having compensation for dimensional changes comprising:
   at least one magnetic disk having a plurality of ring-like servo tracks and a plurality of data tracks between a pair of said servo tracks,
   at least one magnetic head for detecting track data,
   a carriage for moving said magnetic head in a radial direction of said magnetic disk,
   a driver for driving said carriage,
   a position controller for controlling said driver according to a head displacement command to position said magnetic head to one of said servo or data tracks,
   an off-set detector for detecting an amount and a direction of off-set of said magnetic head with respect to a desired servo track when said magnetic head is positioned to said desired servo track and an amount and a direction of off-set of said magnetic head with respect to a desired data track when said magnetic head is positioned to said desired data track,
   a memory for storing off-set signals from said off-set detector, and
   an off-set corrector for correcting said off-set between said magnetic head and said desired data track, said off-set corrector serving to read out an off-set signal representing said amount and said direction of off-set of said magnetic head with respect to said desired servo track, from said memory, then correct said off-set between said magnetic head and said desired data track according to said off-set signal, then read out an off-set signal representing said amount and said direction of off-set of said magnetic head with respect to said desired data track from said memory, and correct said off-set between said magnetic head and said desired data track.

2. A magnetic disk device having compensation for dimensional changes comprising:
   at least one magnetic disk having a plurality of ring-like servo tracks and a plurality of data tracks between a pair of said servo tracks,
   at least one magnetic head for detecting track data,
   a carriage for moving said magnetic head in a radial direction of said magnetic disk,
   a driver for driving said carriage,
   a position controller for controlling said driver according to a head displacement command to position said magnetic head to one of said servo or data tracks, an off-set detector;
   an off-set detector;
   a first auxiliary position controller for storing a first off-set data from said off-set detector;
   an off-set generator for generating a predetermined dummy off-set signal;
   a second auxiliary position controller for storing a second off-set data from said off-set detector in response to said dummy off-set signal; and
   an off-set corrector responsive to said first off-set data read out of said first auxiliary position controller to correct a first off-set between said magnetic head and said data track and then responsive to said second off-set data read out of said second auxiliary position controller to correct a second off-set between said magnetic head and said data track due to variations in room temperature.

3. A magnetic disk storage device having compensation for dimensional changes, which comprises:
   at least one magnetic disk having a plurality of track blocks, each having at least one circular servo track and a plurality of circular data tracks inside said servo track;
   at least one magnetic head for reading or writing information in said magnetic disk;
   a carriage for supporting said magnetic head;
   a driver for moving said carriage so that said magnetic head moves backwards and forwards from one track to another over a surface of said magnetic disk;

a position controller responsive to a head moving command to control said driver so that said magnetic head is positioned on a desired data track;

an off-set generator for generating a dummy off-set signal having a predetermined waveform;

an off-set detector for detecting an off-set of said magnetic head caused by said dummy off-set signal from said desired data track to produce an off-set signal indicative of an amount and a direction of said off-set; and an off-set corrector responsive to said off-set signal to correct said off-set of said magnetic head from said desired data track.

4. The magnetic disk storage device of claim 3, wherein said servo track comprises two different groups of magnetic generators which are alternately placed on opposite sides of said servo track.

5. The magnetic disk storage device of claim 3, wherein said dummy off-set signal has a rectangular waveform.

* * * * *